(12) United States Patent
Gallagher Gil (10) Patent No.: US 11,142,060 B2
(45) Date of Patent: Oct. 12, 2021

(54) SHUTTER DEVICE FOR A FRONT GRILLE OF A VEHICLE

(71) Applicant: Batz, S. COOP., Igorre (ES)

(72) Inventor: Sarah Gallagher Gil, Bilbao (ES)

(73) Assignee: Batz, S. COOP., Igorre (ES)

( * ) Notice: Subject to any disclaimer, the term of this patent is extended or adjusted under 35 U.S.C. 154(b) by 239 days.

(21) Appl. No.: 16/594,264

(22) Filed: Oct. 7, 2019

(65) Prior Publication Data

US 2020/0130500 A1 Apr. 30, 2020

(30) Foreign Application Priority Data

Oct. 24, 2018 (EP) .................................... 18382755

(51) Int. Cl.
*B60K 11/08* (2006.01)

(52) U.S. Cl.
CPC .................................. *B60K 11/085* (2013.01)

(58) Field of Classification Search
CPC ........ B60K 11/085; B60K 11/08; Y02T 10/88
See application file for complete search history.

(56) References Cited

U.S. PATENT DOCUMENTS

| | | | | |
|---|---|---|---|---|
| 5,470,276 A | * | 11/1995 | Burnell | B60H 1/345 454/155 |
| 10,100,707 B2 | * | 10/2018 | Wolf | F01P 7/10 |
| 10,421,352 B2 | * | 9/2019 | Urbach | B60K 11/085 |
| 2010/0243352 A1 | * | 9/2010 | Watanabe | B60K 11/085 180/68.1 |
| 2011/0048691 A1 | * | 3/2011 | Shin | B60K 11/085 165/299 |
| 2013/0264047 A1 | * | 10/2013 | Charnesky | B60K 11/085 165/287 |
| 2014/0094104 A1 | * | 4/2014 | Manhire | B60K 11/085 454/152 |
| 2014/0308890 A1 | | 10/2014 | Schneider | |

(Continued)

FOREIGN PATENT DOCUMENTS

| | | |
|---|---|---|
| EP | 2641768 A1 | 9/2013 |
| EP | 2687394 A1 | 1/2014 |

(Continued)

OTHER PUBLICATIONS

Extended European Search Report in corresponding European Patent Application No. 18382755.9, dated May 8, 2019, 5 pages.

*Primary Examiner* — Joseph J Dallo
*Assistant Examiner* — Kurt Philip Liethen
(74) *Attorney, Agent, or Firm* — Edell, Shapiro & Finnan, LLC (57) ABSTRACT

Shutter device for a front grille of a vehicle that according to one embodiment includes a frame, a driving flap pivotally coupled to the frame and suitable for pivoting between an airflow blocking position and an opening position. The driving flap is coupled to a rotary actuator by a rotary shaft for moving the driving flap. The shaft includes a first stop configured for being supported on a first final stop of the frame when the driving flap is arranged in the blocking position. The shaft also includes a second stop arranged on the shaft, the second stop being axially and angularly displaced with respect to the first stop, and is also configured for being supported on a second final stop of the frame when the driving flap is arranged in the blocking position.

20 Claims, 7 Drawing Sheets

(56) References Cited

U.S. PATENT DOCUMENTS

| | | | | |
|---|---|---|---|---|
| 2015/0090508 | A1* | 4/2015 | Chappex | B60K 11/085 |
| | | | | 180/68.1 |
| 2016/0207394 | A1* | 7/2016 | Vacca | B60K 11/085 |
| 2016/0272060 | A1 | 9/2016 | Edwards et al. | |
| 2017/0297424 | A1* | 10/2017 | Ibanez Moreira | F16H 37/12 |

FOREIGN PATENT DOCUMENTS

| | | |
|---|---|---|
| EP | 3002145 A1 | 4/2016 |
| EP | 3093511 A1 | 11/2016 |
| EP | 3210811 A1 | 8/2017 |
| EP | 3427988 A1 | 1/2019 |
| WO | 2015074675 A1 | 5/2015 |

* cited by examiner

SHUTTER DEVICE FOR A FRONT GRILLE OF A VEHICLE

CROSS-REFERENCE TO RELATED APPLICATIONS

This application relates to and claims the benefit and priority to European Application No. EP18382755.9, filed Oct. 24, 2018.

TECHNICAL FIELD

The present invention relates to a shutter device for a front grille of a motor vehicle.

BACKGROUND

Shutter devices which are arranged between the front grille and at least one heat exchanger of a vehicle are known. Said shutter devices control the passage of air from the front grille to the heat exchanger, which is in charge of dissipating the heat from the engine of the vehicle according said engine's cooling needs.

Shutter devices comprising a frame and a plurality of flaps pivotally coupled to said frame are known, with at least one of said flaps being a driving flap, the flaps being positioned so as to obtain the airflow required for cooling the engine's heat exchanger. These shutter devices also comprise an actuator for delivering torque and moving the driving flap, said driving flap being suitable for transmitting the movement of the actuator to the flaps. These shutter devices also comprise a shaft which allows coupling the actuator and the driving flap.

US2014308890A1 describes a shutter device comprising a frame, a driving flap pivotally coupled to said frame and suitable for pivoting between an airflow blocking position and an opening position, a rotary actuator for delivering torque and moving the driving flap, and a rotary shaft for coupling the actuator and the driving flap. The shaft comprises a stop configured for being supported on a final stop of the frame when the driving flap is arranged in the blocking position.

SUMMARY

According to one embodiment a shutter device is provided that comprises a frame, a driving flap pivotally coupled to said frame and suitable for pivoting between an airflow blocking position and an opening position, a rotary actuator for delivering torque and moving the driving flap, and a rotary shaft for coupling the actuator and the driving flap, the shaft comprising a first stop configured for being supported on a final stop of the frame when the driving flap is arranged in the blocking position. The shaft also comprises a second stop arranged on the shaft, the second stop being axially and angularly displaced with respect to the first stop, and said second stop also being configured for being supported on a final stop of the frame when the driving flap is arranged in the blocking position.

The driving flap is pivotally supported at one end with respect to the frame, and at the other end it comprises the rotary shaft, which is coupled to the actuator. The driving flap rotates when the actuator delivers torque to the rotary shaft. The rotary shaft is a weak element in the coupling between the actuator and the driving flap and mainly works under torsion, where said shaft may break mainly when the driving flap is arranged in the blocking position. The driving flap is subjected to forces which also make it work under bending, with this situation occurring, for example, when the wind acts on the driving flap, where bending stresses occur along the entire flap.

By incorporating the stops in the shaft, which stops are angularly displaced in the circumferential direction and axially displaced, around and along, respectively, the axial axis of rotation of the rotary shaft, when said stops are supported on the final stops of the frame in the blocking position of the driving flap, the forces are compensated for and, accordingly, the rotary shaft does not work under bending. Breaking of the rotary shaft of the shutter device is therefore prevented in a simple and low-cost manner.

These and other advantages and features will become apparent in view of the drawings and detailed description.

DETAILED DESCRIPTION

Shutter devices are used to regulate airflow outside the vehicle into said vehicle, into one or more heat exchangers, such as radiators, for example. Heat exchangers are used to regulate the temperature of a fluid circulating in an internal combustion engine. Therefore, the temperature of a fluid of the engine of the vehicle is regulated with the help of the shutter device.

Figure 1:
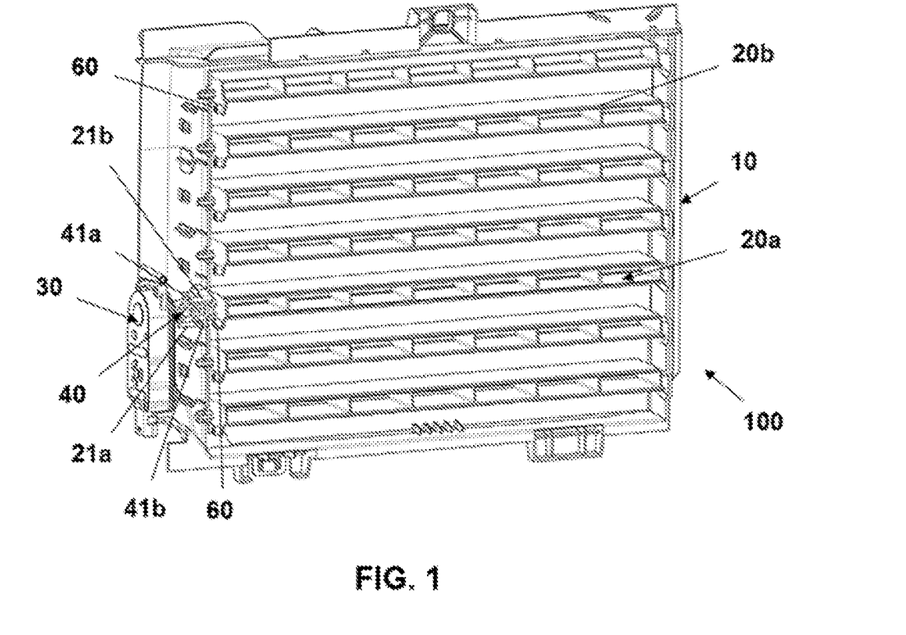
FIG. 1 shows a perspective view of an embodiment of a shutter device in which the flaps are in the opening position.

The shutter device is arranged in an opening of the chassis of the vehicle (not shown in the drawings), such that the airflow outside the vehicle goes through the opening of the chassis of the vehicle, through the shutter device, towards the heat exchanger. FIG. 1 shows a perspective view of an embodiment of the shutter device 100 for a front grille of a vehicle. In this embodiment, the shutter device 100 comprises a frame 10 which is fitted to the opening of the chassis of the vehicle, a driving flap 20a pivotally coupled to said frame 10 and suitable for pivoting between an airflow blocking position and an opening position, a rotary actuator 30 for delivering torque and moving the driving flap 20a, and a rotary shaft 40 for coupling the actuator 30 and the driving flap 20a, the shaft 40 comprising a first stop 41a configured for being supported on a final stop 21a of the frame 10 when the driving flap 20a is arranged in the blocking position. The shaft 40 also comprises a second stop 41b arranged on the shaft 40, the second stop 41b being axially and angularly displaced with respect to the first stop 41a, and said second stop 41b also being configured for being supported on a final stop 21b of the frame 10 when the driving flap 20a is arranged in the blocking position.

The shutter device 100 also comprises a plurality of flaps 20b (six flaps in this embodiment) which are coupled to the driving flap 20a by means of a linkage (not shown in the drawings), which is coupled on a coupling element 60 of each flap 20a and 20b of the shutter device 100, where said linkage allows the pivoting of the flaps 20b between the airflow blocking position and the opening position together with the driving flap 20a. In FIG. 1 the flaps 20a and 20b are in the opening position, and in FIGS. 2 and 3, which show a perspective view of the shutter device 100 of FIG. 1, the flaps 20a and 20b are in the blocking and opening positions, respectively.

Figure 5:
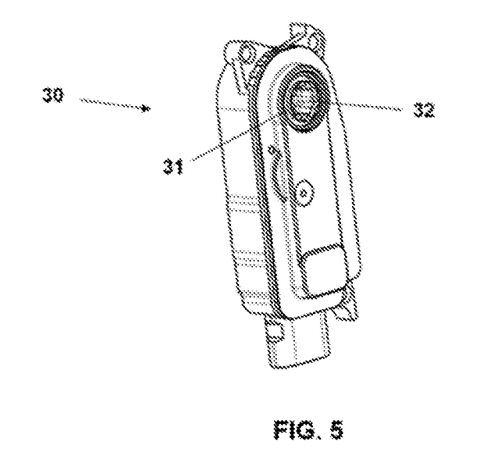
FIG. 5 shows a perspective view of the rotary actuator of the shutter device of FIG. 1.

FIG. 5 shows a perspective view of the rotary actuator 30 of the shutter device 100 of FIG. 1. The actuator 30 comprises an actuating motor and control means (not shown in the drawings) which are electrically connected with an external supply source. The actuator 30 comprises a fitting portion comprising a rotary bearing 31, inside which there is arranged a fitting hole 32 which rotates with the rotation of the bearing 31. The hole 32 comprises a grooved inner circumferential surface around the axis of rotation of the bearing 31.

Figure 6:
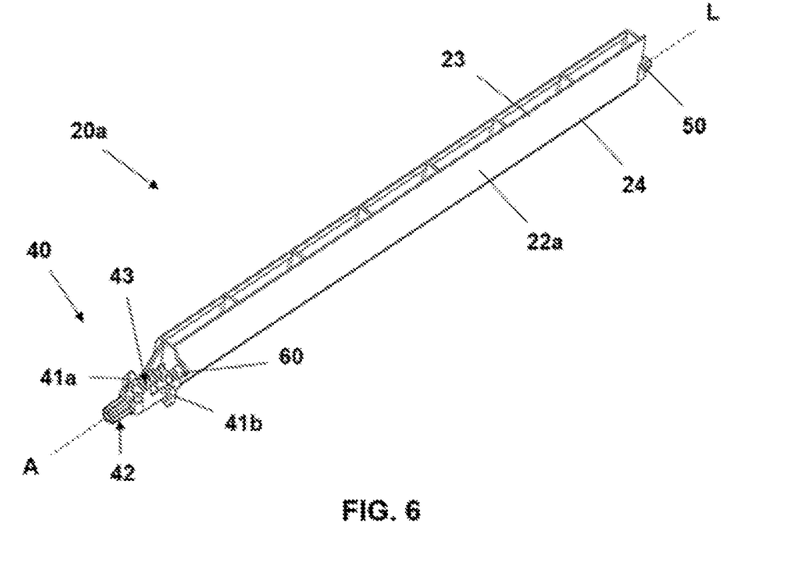
FIG. 6 shows a perspective view of the driving flap of the shutter device of FIG. 1.

FIG. 6 shows a perspective view of the driving flap 20a of the shutter device 100 of FIG. 1. In this embodiment of the shutter device 100, the driving flap 20a is a single part made of plastic by means of injection. Said driving flap 20a comprises an elongated central body 22a with a double wall separated by openings generating a gap on the inside thereof. Each of the walls of the body 22a comprises a flap 23 and 24 on each of its longitudinal sides. At one end of the driving flap 20a there is arranged the rotary shaft 40 attached to the central body 22a, the shaft 40 defining an axial axis of rotation A. The shaft 40 comprises an driving shaft 42 comprising a grooved outer circumferential surface which is coupled, during usage of the shutter device 100, with the grooved inner surface of the hole of the actuator 30 in a connection for torque delivery, the axis of rotation A of the shaft 40 and the axis of rotation of the bearing 31 of the actuator 30 being coaxial.

The shaft 40 also comprises a shaft portion 43 which is attached to the driving shaft 42 in the axial direction of the axis of rotation A, forming a single part. The shaft portion 43 is integrally attached to the body 22a of the driving flap 20a, the stops 41a and 41b of the shaft 40 being arranged in the shaft portion 43. Both the driving shaft 42 and the shaft portion 43 have a substantially cylindrical shape. There is arranged at the other end of the driving flap 20a, opposite the end at which the shaft 40 is arranged, a pivot shaft 50 having small dimensions, coupled in a housing of the frame 10 of the shutter device 100 (not shown in the drawings), which pivot shaft 50 allows the pivoting of the driving flap 20a, when the actuator 30 is operated, around the axis of rotation A.

When the vehicle is operating, and particularly when said vehicle starts to move, the outside air applies a front force on the vehicle, on the flaps of the shutter device 100. Particularly when the flaps are in the blocking position, the outside air applies force on the entire flap, producing bending stresses in said flaps. The flaps 20b are pivotally coupled to the frame 10 by means of pivot shafts similar to pivot shaft 50 of driving flap 20a. The bending stresses are smaller in flaps 20b than in driving flap 20a, since in said driving flap 20a the shaft 40 projects out for being coupled with the actuator 30, and when the actuator 30 is acting, it applies torque on the shaft 40 to cause the rotation of driving flap 20a. Depending on the type of vehicle in which the shutter device 100 is arranged, between the airflow blocking position and the opening position, driving flap 20a, and therefore also flaps 20b, can have defined intermediate positions in which the direction of outside airflow is not parallel to the plane defined by the body of the flaps, with significant bending stresses also being produced in the flaps, particularly in driving flap 20a.

Figure 7:
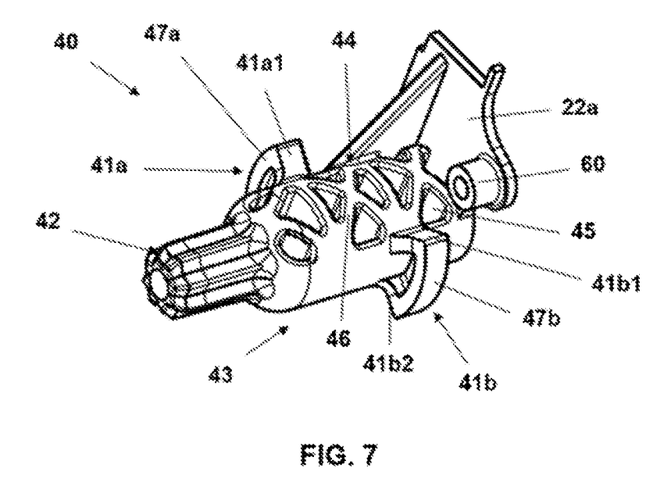
FIG. 7 shows a perspective view of the rotary shaft of the driving flap of FIG. 6.
Figure 8:
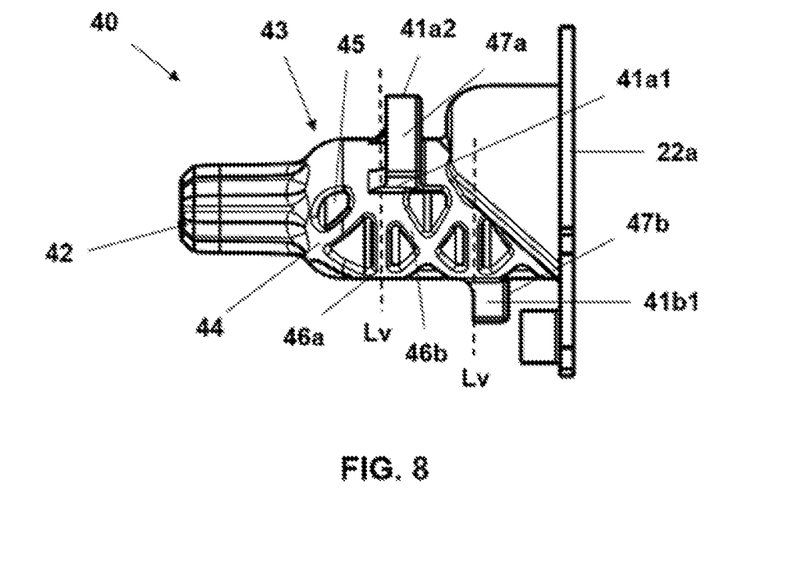
FIG. 8 shows a side view of the rotary shaft of FIG. 7.
Figure 9:
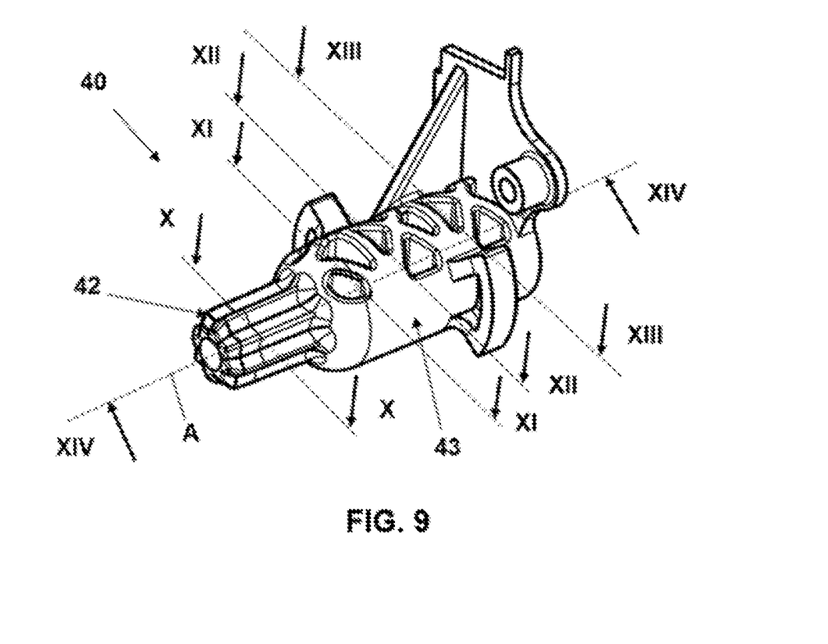
FIG. 9 shows a perspective view of the rotary shaft of FIG. 7, in which cutting sections are defined.

In one embodiment of the shutter device 100, the blocking position and the opening position of the driving flap 20a are angularly displaced 90°, although in other embodiments the angle of displacement can be different, for example, 120°. FIG. 7 shows a perspective view of the rotary shaft 40 of the driving flap 20a of FIG. 6, and FIGS. 8 and 9 show a side view and a perspective view, in which cutting sections are defined, of the rotary shaft 40 of FIG. 7. Stops 41a and 41b on shaft 40 are axially displaced along the axis of rotation A and angularly displaced in a circumferential direction around the axis of rotation A, the first stop 41a and second stop 41b each being configured in a single part. In other embodiments of the shutter device 100, the stops 41a and 41b can be configured with each of them forming more than one stop.

The stops 41a and 41b shown in FIGS. 7-8 comprise a respective body 47a and 47b, which radially project from the surface of the shaft portion 43, having a shape that is the sector of a circle at an a angle of a little less than 90°, and with a radial axis orthogonal to the axis of rotation A. In this embodiment of the shutter device 100, the bodies 47a and 47b are angularly displaced around the circumferential direction of the shaft 40, on the radial axis thereof at about 180°. Each of said bodies 47a and 47b comprises at each of its ends in the circumferential direction, a contact surface 41a1 and 41a2 of stop 41a, and 41b1 and 41b2 of stop 41b, which are flat.

Figure 2:
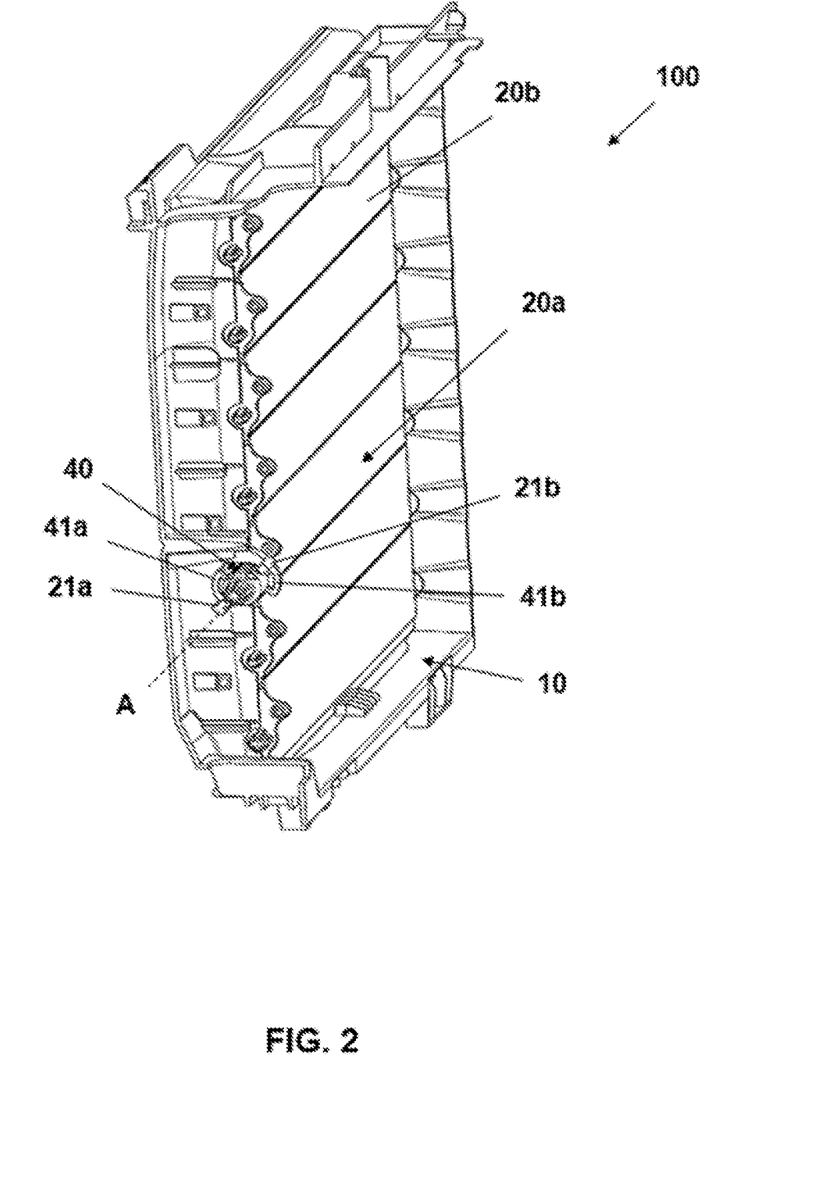
FIG. 2 shows a perspective view of the shutter device of FIG. 1, in which the flaps are in the blocking position and the rotary actuator has been removed.
Figure 3:
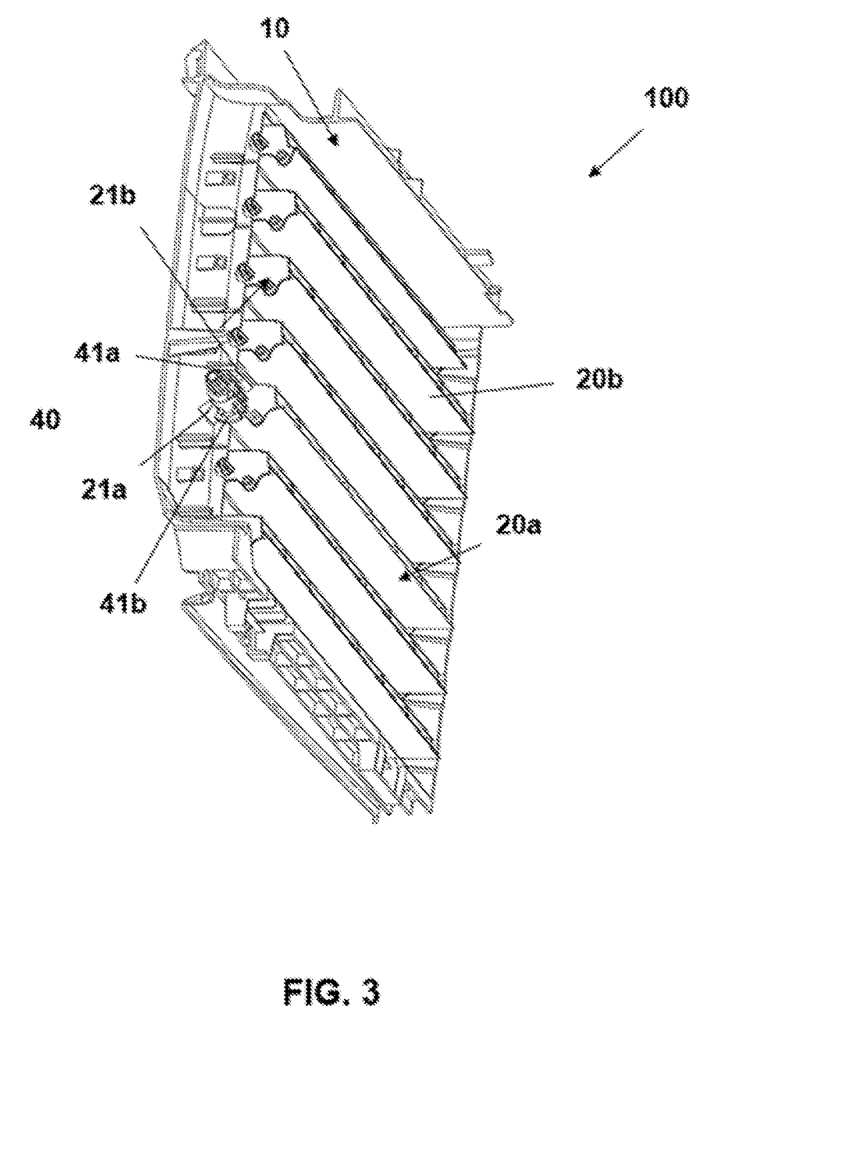
FIG. 3 shows a perspective view of the shutter device of FIG. 1, in which the flaps are in the opening position and the rotary actuator has been removed.

The first final stop 21a and the second final stop 21b shown in FIGS. 1-3 are projections which project from the frame 10 in a direction parallel to the axial direction of the axis of rotation A and are arranged around the shaft 40 in a circumferential direction. According to one embodiment, the final stops 21a and 21b are each configured in a single part and have a sufficient length so that the stops 41a and 41b are supported on only two final stops when the driving flap 20a is in the blocking position and when it is in the opening position. Said final stops 21a and 21b comprise flat surfaces in both directions of rotation of the shaft 40 and are angularly displaced by a little less than 180°.

When the driving flap 20a is in the blocking position, the contact surface 41a2 of the body 47a of the first stop 41a is supported on one of the flat surfaces of the final stop 21a, and the contact surface 41b1 of the body 47b of the second stop 41b is supported on one of the flat surfaces of the final stop 21b. The driving shaft 42 of shaft 40 is coupled in the hole 32 of the actuator 30, such that when the contact surface 41a2 of the first stop 41a is supported on one of the flat surfaces of the final stop 21a, the segment of shaft 40 between the free end of the driving shaft 42 and the axial position of the first stop 41a stops working under bending because the loads are distributed between both supports. When the contact surface 41b1 of the second stop 41b is supported on one of the flat surfaces of the final stop 21b, the segment of shaft 40 between the position of the stops 41a and 41b also stops working under bending, because opposing forces are produced in the supports of said stops 41a and 41b.

Likewise, although the air outside the vehicle applies a smaller force on the flaps of the shutter device 100 when said flaps are in the opening position, bending stresses are also generated in the flaps, and particularly greater bending stresses are generated in driving flap 20a. To solve this problem, the stops 41a and 41b are configured for being supported on the final stops 21a and 21b of the frame 10 also in the opening position. Therefore, when the driving flap 20a is in the opening position, as shown in FIGS. 1 and 3, the contact surface 41a1 of the body 47a of the first stop 41a is supported on the other one of the flat surfaces of the final stop 21b, and the contact surface 41b2 of the body 47b of the second stop 41b is supported on the other one of the flat surfaces of the final stop 21a. As described above for the blocking position, bending stresses along the shaft 40 are eliminated because the forces produced in the supports are opposing forces.

The first stop 41a is arranged closer to the actuator 30 than the second stop 41b is in the axial direction of the shaft 40. As described, in this embodiment of the shutter device 100 the driving flap 20a is made of plastic by means of injection, which may, due to the dimensional tolerances that may be obtained in the manufacture of the driving flap 20a, cause stops 41a and 41b not to be supported on final stops 21a and 21b at the same time. In order to assure that bending stresses are eliminated along the shaft 40, stops 41a and 41b and final stops 21a and 21b are sized such that the first stop 41a is supported on the final stop 21a before the second stop 41b is supported on the final stop 21b when the driving flap 20a is moved to the blocking position. Likewise, the first stop 41a is supported on the final stop 21b before the second stop 41b is supported on the final stop 21a when the driving flap 20a is moved to the opening position. Therefore, it is assured that both in the blocking position and in the opening position of the driving flap 20a, the first stop 41a, the one closer to the actuator 30, is first supported on the corresponding final stops 21a and 21b, and when the outside air applies external force on the driving flap 20a, causing bending stresses, said driving flap 20a bends, and this causes the second stop 41b to move and then be supported on the corresponding final stop 21b and 21a.

Figure 4:
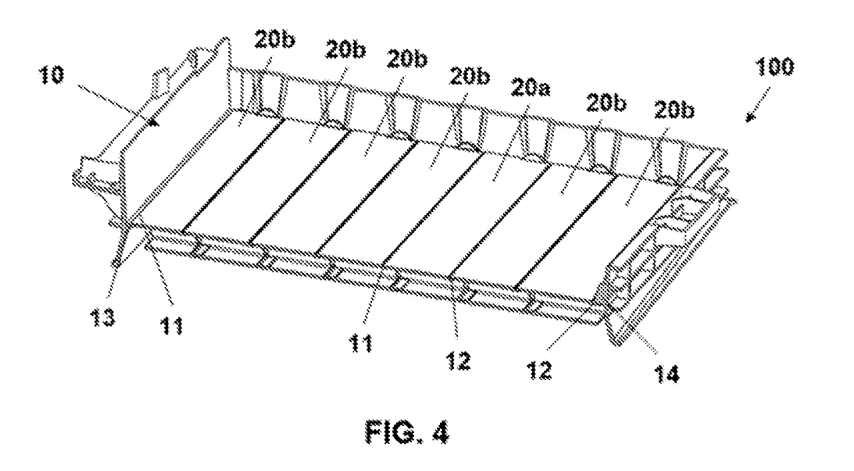
FIG. 4 shows a perspective section view of the shutter device of FIG. 1, in which the flaps are in the blocking position.

FIG. 4 shows a perspective section view of the shutter device 100 of FIG. 1, in which the flaps 20a and 20b are in the blocking position. Each of the walls of the body 22a of the driving flap 20a comprises flaps 23 and 24 on its longitudinal sides. Said flaps 23 and 24 form corresponding flap stops 11 and 12. The flaps 20b have the same structure forming flap stops 11 and 12. When the driving flap 20a is moved to the blocking position, flap stops 11 and 12 are supported on corresponding flap stops 12 and 11 of flaps 20b, which are located on the sides thereof. The flap stops 11 and 12 of flaps 20b located at the ends of the frame 10 are accordingly supported on frame stops 13 and 14. To assure the elimination of the bending stresses along the body of flaps 20a and 20b, due to the force applied by the outside air when the driving flap 20a is moved to the blocking position, the shutter device 100 is sized such that flap stops 11 and 12 of different flaps 20a and 20b are supported on one another, and flap stops 11 and 12 of flaps 20b of the ends are supported on frame stops 13 and 14, before the first stop 41a of shaft 40 is supported on the final stop 21a. Therefore, the full sequence in the shutter device 100 when the driving flap 20a is moved to the blocking position is first the flaps 20a and 20b are supported on one another with flap stops 11 and 12 and on the frame 10 with frame stops 13 and 14, then the first stop 41a is supported on final stop 21a, and finally the second stop 41b is supported on final stop 21b.

Going back to FIGS. 7-9, the shaft portion 43 of the shaft 40 comprises a ribbed section 44 which is arranged in the shaft portion 43 in the axial direction between the attachment of the shaft portion 43 with the driving shaft 42, and the attachment of the shaft portion 43 with the body 22a of the driving flap 20a. This ribbed section 44 is not distributed on the entire perimeter of the shaft portion 43, but rather only on a portion of said perimeter, this portion in this embodiment of the shutter device 100 being the portion corresponding to the perimeter segment of the shaft portion 43 arranged between stops 41a and 41b.

Figure 10:
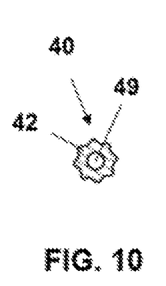
FIGS. 10-13 show section views according to lines X-X, XI-XI, XII-XII, and XIII-XIII of the rotary shaft of FIG. 9.
Figure 11:
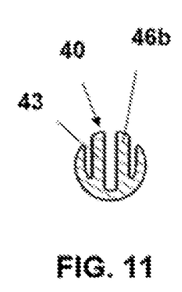
Figure 12:
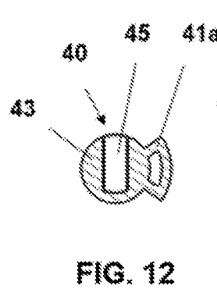
Figure 13:
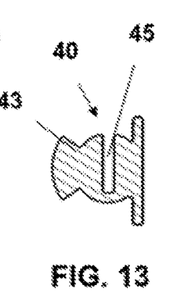

The ribbed section 44 is formed on the surface of the shaft portion 43 with a plurality of holes 45, a plurality of ribs 46 distributed throughout the ribbed section 44 defining the separation between said holes 45. These holes 45 are formed in the injection process of the driving flap 20a by arranging a plurality of projections in the injection mold in a position orthogonal to the axis of rotation A, in the position of shaft portion 43, preferably in a direction aligned with the transverse axis of the body 22a of the driving flap 20a, and without going through the shaft portion 43, thereby preventing deformations in the shaft portion 43. The spaces filled with plastic in the ribbed section 44 in the shaft portion 43 form the ribs 46. FIGS. 10-13 show section views according to lines X-X, XI-XI, XII-XII, and XIII-XIII of rotary shaft 40 of FIG. 9. Therefore, FIG. 10 shows a cross section of the driving shaft 42, said driving shaft 42 comprising a longitudinal hole 49 open at the end closest to the actuator 30 and blind at the other end thereof, thereby preventing deformations in the driving shaft 42 when the driving flap 20a is injected. FIGS. 11-13 show cross sections of the shaft portion 43 in different axial positions of said shaft portion 43, from the position closest to the driving shaft 42 shown in FIG. 11, an intermediate position in FIG. 12, and the farthest position shown in FIG. 13. Both holes 45 and ribs 46 can be seen in said drawings.

In this embodiment of the shutter device 100, the ribs 46 are orthogonal ribs 46a which run partially in the circumferential direction of the shaft portion 43 in a transverse direction with respect to the axis of rotation A, and diagonal ribs 46b which run partially in the circumferential direction of the shaft portion 43 in a transverse direction with respect to the axis of rotation A, oriented angularly with respect to said axis of rotation A. Given that the ribs 46 have a given wall thickness, each of the orthogonal ribs 46a has a longitudinal axis Lv. In this embodiment of the shutter device 100, these longitudinal axes Lv are parallel to the side faces of the bodies 47a and 47b of the stops 41a and 41b. The orthogonal ribs 46a are distributed on the shaft portion 43 such that the longitudinal axes Lv are moved in the direction of the axis of rotation A of the shaft 40 outside the bodies 47a and 47b of stops 41a and 41b of shaft 40. This distribution of the orthogonal ribs 46a prevents the concentration of torsional stresses in the circumferential direction of the shaft portion 43 when the actuator 30, coupled to the driving shaft 42, rotates the driving flap 20a in the circumferential direction, thereby preventing the existence of weak sections in the event of said torsional stresses. A diagonal rib 46b of the set of diagonal ribs 46b of the ribbed section 44 physically joins the stops 41a and 41b of the shaft 40 together, thereby boosting the strength of the shaft portion 43, and therefore of the shaft 40, should torsional stresses occur.

Figure 14:
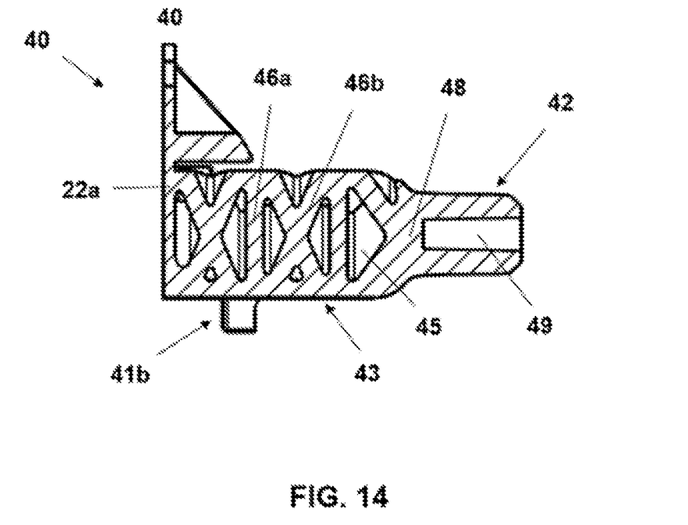
FIG. 14 shows a longitudinal section view according to line XIV-XIV of the rotary shaft of FIG. 9.

Going back to FIG. 9, which shows the rotary shaft 40 in a perspective view, FIG. 14 shows a longitudinal section view according to line XIV-XIV of the rotary shaft 40 of FIG. 9. As can be seen, the cross section of the shaft portion 43 of the shaft 40 is larger than the cross section of the driving shaft 42, thereby achieving a stronger rotary shaft. To prevent stresses from concentrating at the attachment between the shaft portion 43 and the driving shaft 42, said attachment is progressive, without sudden contrasts in the direction of the attachment lines, being made, for example, with an outlet curve of the driving shaft 42 connecting with an inlet curve of the shaft portion 43. The attachment between the driving shaft 42 and the shaft portion 43 is in a transition area 48 having a solid section. The longitudinal hole 49 of the driving shaft 42 is blind and ends in transition area 48. A stronger rotary shaft 40 is thereby achieved should torsional stresses occur when the actuator 30 acts on the rotary shaft 40.

The clauses that follow disclose additional embodiments.

Clause 1: A shutter device for a front grille of a vehicle, comprising a frame (10), a driving flap (20a) pivotally coupled to said frame (10) and suitable for pivoting between an airflow blocking position and an opening position, a rotary actuator (30) for delivering torque and moving the driving flap (20a), and a rotary shaft (40) for coupling the actuator (30) and the driving flap (20a), the shaft (40) comprising a first stop (41a) configured for being supported on a final stop (21a) of the frame (10) when the driving flap (20a) is arranged in the blocking position, the shaft (40) also comprises a second stop (41b) arranged on the shaft (40), the second stop (41b) being axially and angularly displaced with respect to the first stop (41a), and said second stop (41b) also being configured for being supported on a final stop (21b) of the frame (10) when the driving flap (20a) is arranged in the blocking position.

Clause 2: Shutter device according to clause 1, wherein both stops (41a, 41b) are configured for being supported on final stops (21a, 21b) of the frame (10) also in the opening position.

Clause 3: The shutter device according to clause 2, wherein the first stop (41a) and the second stop (41b) are each configured in a single part.

Clause 4: The shutter device according to clause 3, wherein the frame (10) comprises a first final stop (21a) and a second final stop (21b), each of them being configured in a single part, such that in the blocking position the first stop (41a) is supported on the first final stop (21a) and the second stop (41b) is supported on the second final stop (21b), and in the opening position the first stop (41a) is supported on the second final stop (21b) and the second stop (41b) is supported on the first final stop (21a).

Clause 5: The shutter device according to any of clauses 1 to 4, wherein the first stop (41a) is arranged closer to the actuator (30) than the second stop (41b) is, said stops (41a, 41b) and the final stops (21a, 21b) being sized such that the first stop (41a) is supported on the corresponding final stop (21a, 21b) before the second stop (41b) is supported on the corresponding final stop (21a, 21b) when the driving flap (20a) is moved to the blocking position.

Clause 6: The shutter device according to clause 5, wherein the driving flap (20a) is supported on flap stops (11, 12) in the blocking position, the device (100) being sized such that the driving flap (20a) is supported on the flap stops (11, 12) before the first stop (41a) of the shaft (40) is supported on its respective final stop (21a) when the driving flap (20a) is moved to the blocking position.

Clause 7: The shutter device according to any of the preceding clauses, wherein the shaft (40) comprises an driving shaft (42) coupled to the actuator (30) in a connection for torque delivery, and a shaft portion (43) arranged axially after the driving shaft (42) and attached to a body (22a) of the driving flap (20a), the stops (41a, 41b) being arranged in the shaft portion (43), wherein the shaft portion (43) and the body (22a) of the driving flap (20a) preferably form a single part.

Clause 8: The shutter device according to clause 7, wherein the shaft portion (43) comprises a ribbed section (44) arranged axially at least in the segment between the stops (41a, 41b), and arranged in at least part of the perimeter contour of the shaft portion (43).

Clause 9: The shutter device according to clause 8, wherein the ribbed section (44) comprises a plurality of holes (45), a plurality of ribs (46) distributed throughout the ribbed section (44) defining the separation between said holes (45), wherein the holes (45) are arranged in a direction orthogonal to the axial axis (A) of rotation of the shaft (40), preferably in a direction aligned with the transverse axis of the body (22a) of the driving flap (20a), and not going through the shaft portion (43).

Clause 10: The shutter device according to clause 9, wherein the ribbed section (44) comprises orthogonal ribs (46a) and diagonal ribs (46b) oriented with respect to the direction of the axial axis (A) of the shaft (40), the longitudinal axes (Lv) of the orthogonal ribs (46a) being axially moved with respect to the stops (41a, 41b) of the shaft (40).

Clause 11: The shutter device according to clause 10, wherein the ribbed section (44) comprises at least one diagonal rib (46b) joining the stops (41a, 41b) of the shaft (40) together.

Clause 12: The shutter device according to clauses 7 to 11, wherein the cross section of the shaft portion (43) of the shaft (40) is larger than the cross section of the driving shaft (42).

Clause 13: The shutter device according to clause 12, wherein the attachment between the driving shaft (42) and the shaft portion (43) of the shaft (40) is in a progressive and solid-section transition area (48).

Clause 14: The shutter device according to any of clauses 7 to 13, wherein the driving shaft (42) comprises a longitudinal blind hole (49).

Clause 15: A motor vehicle comprising a shutter device (100) according to any of the preceding clauses.

What is claimed is:

1. A shutter device for a front grille of a vehicle, the shutter device comprising:
   a frame including a first final stop and a second final stop spaced apart from the first final stop;
   a driving flap pivotally coupled to the frame and configured to pivot between an airflow blocking position and an airflow opening position;
   a rotary shaft having an axis of rotation and being coupled to the driving flap, the rotary shaft including a first stop and a second stop, the second stop being axially and angularly displaced with respect to the first stop; and
   a rotary actuator coupled to the rotary shaft and configured to produce torque to cause the driving flap to pivot between the airflow blocking position and the airflow opening position;
   when the driving flap is in the airflow blocking position the first stop is supported on the first final stop of the frame, and the second stop is supported on the second final stop of the frame.

2. The shutter device according to claim 1, wherein when the driving flap is in the airflow opening position the first stop is supported on the first final stop of the frame, and the second stop is supported on the second final stop of the frame.

3. The shutter device according to claim 1, wherein when the driving flap is in the airflow blocking position a first part of the first stop is supported on a first part of the first final stop of the frame, and a first part of the second stop is supported on a first part of the second final stop of the frame and when the driving flap is in the airflow opening position a second part of the first stop is supported on a second part of the first final stop of the frame, and a second part of the second stop is supported on a second part of the second final stop of the frame.

4. The shutter device according to claim 1, wherein the first stop and the second stop are formed from a single piece of material.

5. The shutter device according to claim 2, wherein the first stop and the second stop are formed from a single piece of material.

6. The shutter device according to claim 1, wherein first final stop and the second final stop are formed from a single piece of material.

7. The shutter device according to claim 2, wherein first final stop and the second final stop are formed from a single piece of material.

8. The shutter device according to claim 1, wherein the first and second stops and the first and second final stops are arranged and sized such that the first stop is supported on the first final stop before the second stop is supported on the second final stop when the driving flap is moved to the airflow blocking position.

9. The shutter device according to claim 8, wherein the first stop is arranged closer to the actuator than is the second stop.

10. The shutter device according to claim 8, further comprising a flap located adjacent the driving flap and operatively coupled to the driving flap such that when the driving flat is in the airflow blocking position the flap is also in an airflow blocking position, the flap including a flap stop on which a portion of the driving flap is supported when the driving flap is in the airflow blocking position.

11. The shutter device according to claim 10, wherein when the driving flap is moved to the blocking position the portion of the driving flap is supported on the flap stop before the first stop of the shaft is supported on the first final stop of the frame.

12. The shutter device according to claim 1, wherein the rotary shaft comprises a driving shaft coupled to the rotary actuator and a shaft portion attached to a body of the driving flap, the first and second stops of the rotary shaft being arranged in the shaft portion, the shaft portion and the body of the driving flap being made from a single piece of material.

13. The shutter device according to claim 12, wherein the shaft portion includes a ribbed section arranged between the first and second stops.

14. The shutter device according to claim 13, wherein the ribbed section includes a plurality of ribs that define between them a plurality of holes that extend in directions orthogonal to the axis of rotation of the rotary shaft.

15. The shutter device according to claim 14, wherein the plurality of ribs includes at least first and second orthogonal ribs and at least first and second diagonal ribs that are oriented with respect to the axis of rotation of the rotary shaft, each of the first orthogonal rib and second orthogonal rib respectively having a first longitudinal axis and a second longitudinal axis that are each spaced axially apart from the first and second stops of the rotary shaft.

16. The shutter device according to claim 15, wherein at least one of the first and second diagonal ribs extend between and join the first and second stops of the rotary shaft.

17. The shutter device according to claim 12, wherein the shaft portion has a first cross-section and the driving shaft has a second cross-section, each of the first and second cross-sections being orthogonal to the axis of rotation, the first cross-section being larger than second cross-section.

18. The shutter device according to claim 17, wherein the driving shaft and the shaft portion of the rotary shaft are attached by a solid section of varying diameter.

19. The shutter device according to claim 12, wherein the driving shaft includes a longitudinal blind hole having a central axis corresponding to the axis of rotation of the rotary shaft.

20. A motor vehicle comprising a shutter device according to claim 1.

* * * * *